(12) United States Patent
Niwa

(10) Patent No.: US 9,712,690 B2
(45) Date of Patent: Jul. 18, 2017

(54) INFORMATION PROCESSING APPARATUS, INFORMATION PROCESSING SYSTEM, INFORMATION PROCESSING METHOD, AND A COMPUTER PROGRAM PRODUCT

(71) Applicant: Yuichi Niwa, Kanagawa (JP)

(72) Inventor: Yuichi Niwa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/046,944

(22) Filed: Feb. 18, 2016

(65) Prior Publication Data

US 2016/0248921 A1 Aug. 25, 2016

(30) Foreign Application Priority Data

Feb. 23, 2015 (JP) .................................. 2015-032518

(51) Int. Cl.
*G06F 3/12* (2006.01)
*H04N 1/00* (2006.01)

(52) U.S. Cl.
CPC ....... *H04N 1/00204* (2013.01); *H04N 1/0035* (2013.01); *H04N 2201/0094* (2013.01)

(58) Field of Classification Search
USPC ....................................................... 358/1.15
See application file for complete search history.

(56) References Cited

U.S. PATENT DOCUMENTS

| 2006/0028675 | A1* | 2/2006 | Watanabe | ........... G07F 17/0014 |
| | | | | 358/1.15 |
| 2008/0062461 | A1* | 3/2008 | Shiono | .................. G06F 3/1203 |
| | | | | 358/1.15 |
| 2008/0141148 | A1 | 6/2008 | Ogita | |
| 2012/0206332 | A1* | 8/2012 | Yonemoto | ............. G06F 1/1694 |
| | | | | 345/156 |
| 2015/0201099 | A1* | 7/2015 | Hamasaki | .......... H04N 1/00318 |
| | | | | 358/1.15 |
| 2015/0285976 | A1* | 10/2015 | Lee | .................... G02B 27/0093 |
| | | | | 345/32 |
| 2015/0339007 | A1* | 11/2015 | Yoshizawa | ............ G06F 3/0481 |
| | | | | 715/739 |
| 2016/0241534 | A1* | 8/2016 | Eld | ......................... G06F 21/34 |
| 2016/0245542 | A1* | 8/2016 | Maeda | ................. F24F 11/0086 |

FOREIGN PATENT DOCUMENTS

| JP | 2008-167417 | 7/2008 |
| JP | 2011-142640 | 7/2011 |
| JP | 2011-154474 | 8/2011 |

\* cited by examiner

*Primary Examiner* — Jerome Grant, II
(74) *Attorney, Agent, or Firm* — Oblon, McClelland, Maier & Neustadt, L.L.P.

(57) ABSTRACT

An information processing apparatus includes an obtaining unit that obtains configuration information about a screen to be displayed in a device connected to the information processing apparatus via a network; a display control unit that displays the screen in the information processing apparatus based on the configuration information; a changing unit that changes the configuration information in response to an operation on the screen displayed by the display control unit; and a transmission unit that transmits the changed configuration information to one or more devices connected to the information processing apparatus via the network.

21 Claims, 9 Drawing Sheets

FIG.8A

| TYPE | APPLICATION |
|---|---|
| ARRANGEMENT LOCATION | 1-1 |
| ICON ID | 3 |
| APPLICATION ID | 15048295 |
| NAME | COPY |

FIG.8B

| TYPE | WIDGET |
|---|---|
| ARRANGEMENT LOCATION | (1-3,1-7) |
| APPLICATION ID | 42810405 |
| ICON DATA | ... |

FIG.8C

| TYPE | URL |
|---|---|
| ARRANGEMENT LOCATION | 2-2 |
| URL | http://www.abc.com |
| ICON DATA | ... |

INFORMATION PROCESSING APPARATUS, INFORMATION PROCESSING SYSTEM, INFORMATION PROCESSING METHOD, AND A COMPUTER PROGRAM PRODUCT

BACKGROUND OF THE INVENTION

Field of the Invention

The present invention relates to an information processing apparatus, an information processing system, an information processing method, and a computer program product.

Description of the Related Art

Devices, such as image forming devices, are configured to provide various types of functions. However, very few users use all of the functions. Accordingly, for many users, display content of a screen displayed on an operation panel of the device is complicated.

In a technique of enabling the setting of a configuration of a screen displayed on the operation panel by directly operating the operation panel of the image forming device, an operation to change the configuration of the screen needs to be performed via the operation panel of the image forming device. In many cases, ease of use of the operation panel of the device is inferior to ease of use of a keyboard or a mouse of a Personal Computer (PC). Accordingly, an operation via the operation panel of the device is likely to be troublesome.

SUMMARY OF THE INVENTION

In an embodiment, an information processing apparatus is provided. The information processing apparatus includes an obtaining unit that obtains configuration information about a screen to be displayed in a device connected to the information processing apparatus via a network; a display control unit that displays the screen in the information processing apparatus based on the configuration information; a changing unit that changes the configuration information in response to an operation on the screen displayed by the display control unit; and a transmission unit that transmits the changed configuration information to one or more devices connected to the information processing apparatus via the network.

BRIEF DESCRIPTION OF THE DRAWINGS

Other objects and further features of embodiments will become apparent from the following detailed description when read in conjunction with the accompanying drawings, in which:

FIG. 8A is a diagram showing a configuration of a single piece of icon information;

FIG. 8B is a diagram showing a configuration of a single piece of icon information;

FIG. 8C is a diagram showing a configuration of a single piece of icon information;

DESCRIPTION OF THE PREFERRED EMBODIMENTS

Figure 1:
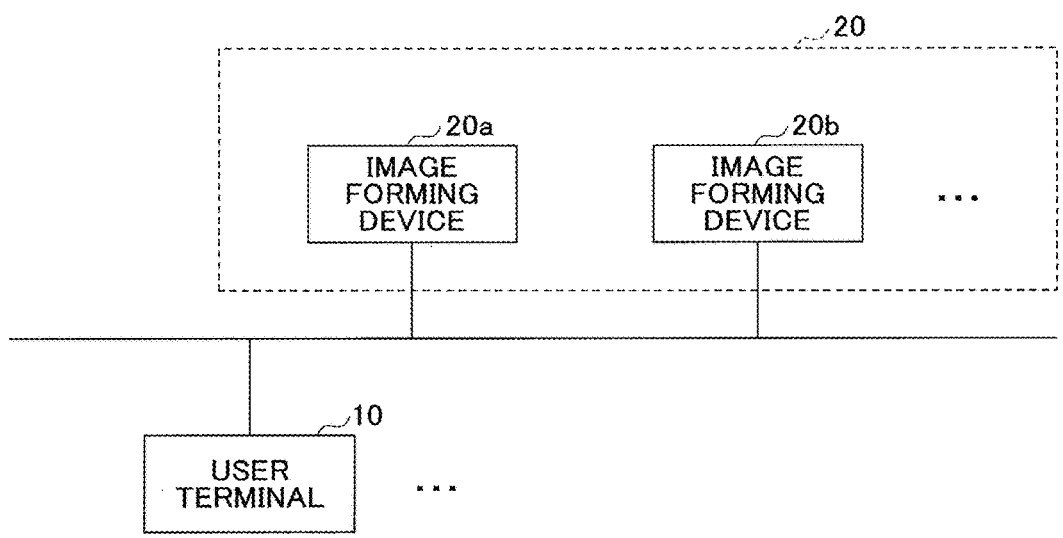
FIG. 1 is a diagram showing a system configuration of an embodiment of the present invention.

In the following, embodiments of the present invention will be described with reference to the drawings. FIG. 1 is a diagram showing a system configuration of the embodiment of the present invention. In FIG. 1, at least one image forming device 20 such as an image forming device 20a and an image forming device 20b, and at least one user terminal 10 are communicatively connected via a Local Area Network (LAN) or a (wired or wireless) network such as the Internet.

The image forming device 20 is a multifunction peripheral that implements, in a single body, two or more functions of printing, scanning, copying, FAX transmission and reception, and the like. However, a device having one of any of the functions may be used as the image forming device 20.

The user terminal 10 is a computer used by a user in order to change a configuration of a screen to be displayed on an operation panel of the image forming device 20. For example, a Personal Computer (PC), a mobile phone, a smartphone, a tablet terminal, a Personal Digital Assistance (PDA), or the like may be used as the user terminal 10.

Figure 2:
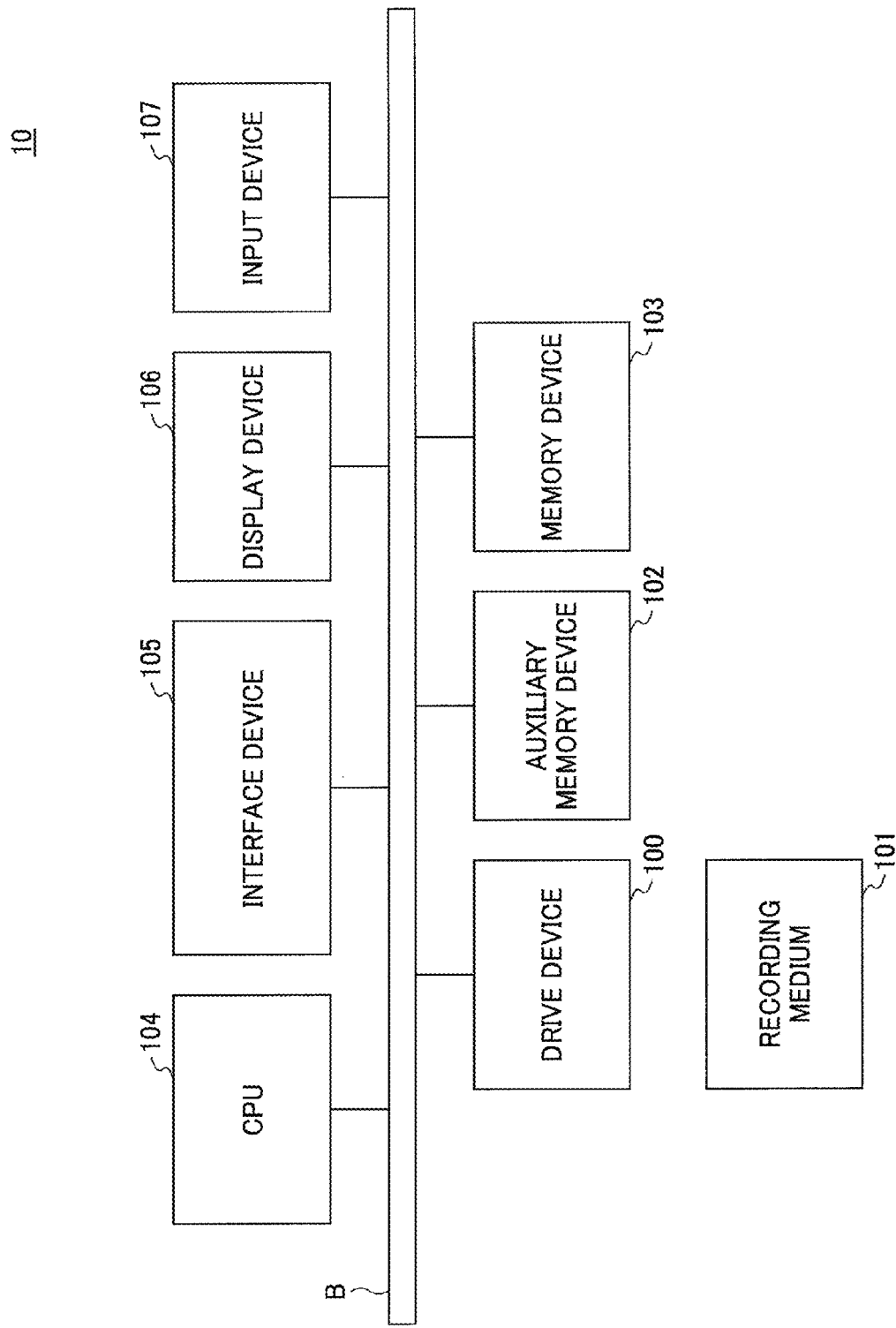
FIG. 2 is a diagram showing a hardware configuration of a user terminal according to an embodiment of the present invention.

FIG. 2 is a diagram showing the hardware configuration of a user terminal in the embodiment of the present invention. The user terminal 10 shown in FIG. 2 includes a drive device 100, an auxiliary memory device 102, a memory device 103, a CPU 104, an interface device 105, a display device 106, an input device 107, and the like interconnected via a bus B.

A program that executes a process in the user terminal 10 is provided via a recording medium 101 such as a CD-ROM. When the recording medium 101 storing the program is connected to the drive device 100, the program is installed on the auxiliary memory device 102 from the recording medium 101 via the drive device 100. However, the program does not need to be installed from the recording medium 101, so that the program may be downloaded from another computer via the network. The auxiliary memory device 102 stores the installed program and also stores necessary files, data, and the like.

The memory device 103 reads and stores the program from the auxiliary memory device 102 in response to an instruction to start the program. The CPU 104 implements functions of the user terminal 10 in accordance with the program stored in the memory device 103. The interface device 105 is used as an interface to connect to the network. The display device 106 displays Graphical User Interface (GUI) by the program. The input device 107 includes a keyboard, a mouse, and the like and is used to input various operation instructions.

Figure 3:
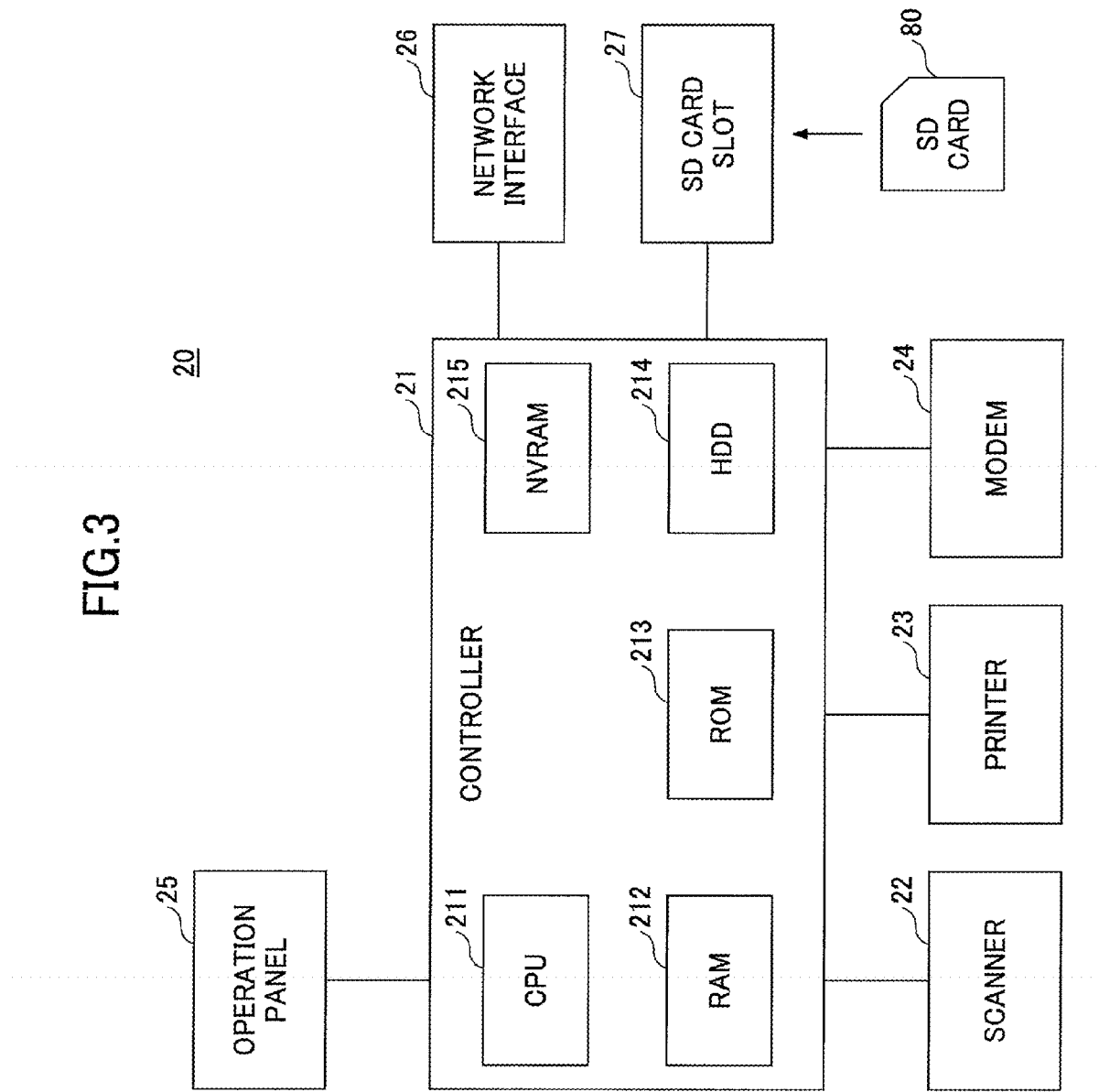
FIG. 3 is a diagram showing a hardware configuration of an image forming device according to an embodiment of the present invention.

FIG. 3 is a diagram showing a hardware configuration of an image forming device according to the embodiment of the present invention. In FIG. 3, the image forming device 20 includes hardware such as a controller 21, a scanner 22, a printer 23, a modem 24, an operation panel 25, a network interface 26, an SD card slot 27, and the like.

The controller 21 includes a CPU 211, a RAM 212, a ROM 213, an HDD 214, and an NVRAM 215, and the like. The ROM 213 stores various types of programs and data to be used by the programs. The RAM 212 is used as a storage area to load the program or a work area of the loaded program. The CPU 211 implements various types of functions by executing the program loaded on the RAM 212. The HDD 214 stores programs and various types of data used by the programs. The NVRAM 215 stores various setting information.

The scanner 22 is hardware (image reading unit) to read image data from a document. The printer 23 is hardware (printing unit) to print printing data on printing paper. The modem 24 is hardware to connect to a telephone line and is used to perform image transmission and reception of image data through FAX communication. The operation panel 25 is hardware including an input unit such as a button to receive an input from the user and a display unit such as a liquid crystal panel. The liquid crystal panel may have a touch panel function. In such case, the liquid crystal panel also functions as the input unit. The network interface 26 is hardware that connects to a (wired or wireless) network such as a LAN. The SD card slot 27 is used to read a program stored in an SD card 80. In other words, in the image forming device 20, not only the program stored in the ROM 213 but also the program stored in the SD card 80 may be loaded on the RAM 212 and executed. In addition, the SD card 80 may be replaced by another recording medium (such as a CD-ROM or a Universal Serial Bus (USB) memory). In other words, a type of the recording medium corresponding to the SD card 80 is not limited to any particular type. In this case, the SD card slot 27 may be replaced by hardware depending on the type of the recording medium.

In addition, the operation panel 25 may be a device such as a dedicated or general-purpose smartphone or tablet terminal having a CPU and an Operating System (OS) that is independent of the image forming device 20. The OS may be Android (registered trademark), for example, which is generally used in smartphones and tablet terminals. In accordance with this, it is possible to display a screen with rich expression in the same manner as in smartphones and tablet terminals and to provide an operational feeling in the same manner as in the smartphones and the tablet terminals. However, the operation panel 25 may be implemented by other devices.

Figure 4:
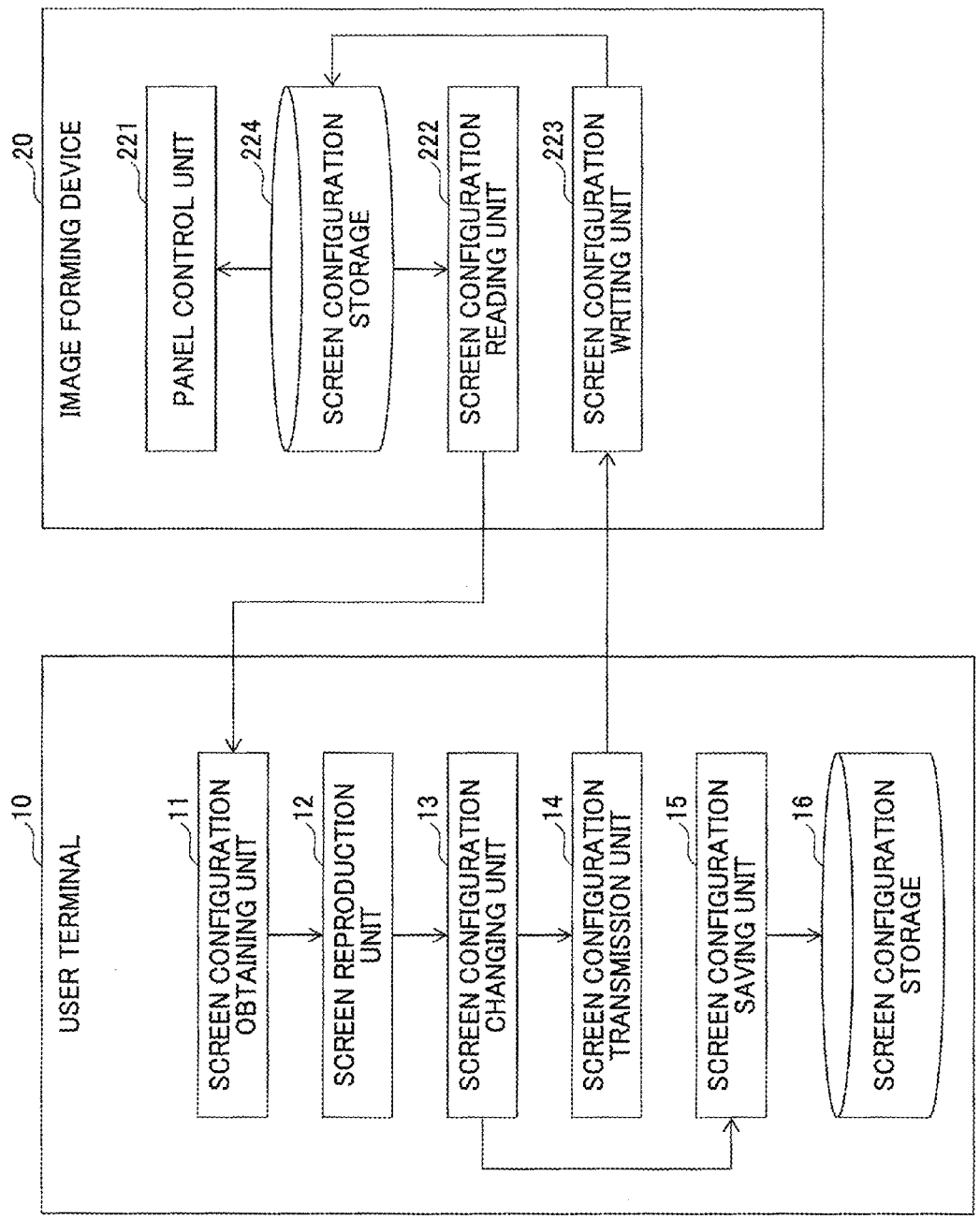
FIG. 4 is diagram showing a functional configuration of a user terminal and an image forming device according to an embodiment of the present invention.

FIG. 4 is diagram showing a functional configuration of the user terminal 10 and the image forming device 20 in the embodiment of the present invention. In FIG. 4, the image forming device 20 includes a panel control unit 221, a screen configuration reading unit 222, a screen configuration writing unit 223, and the like. Each of these units is implemented by a process that at least one program to be installed on the image forming device 20 causes the CPU 211 to perform. The image forming device 20 also uses a screen configuration storage 224. The screen configuration storage 224 can be implemented using the HDD 214 or a storage device that can be connected to the image forming device 20 via a network.

The panel control unit 221 controls display of the screen on the operation panel 25. Among various types of screens displayed on the operation panel 25, an initial screen or a home screen (hereafter collectively referred to as "initial screen") is displayed based on screen configuration information stored in the screen configuration storage 224. The screen configuration information indicates a configuration of the initial screen. The initial screen is a starting point of an operation of the image forming device 20, for example. The initial screen may be displayed first when the image forming device 20 becomes operable. The image forming device 20 becomes operable when a startup of the image forming device 20 is completed or when authentication is successful, if authentication is necessary.

The screen configuration reading unit 222 reads screen configuration information stored in the screen configuration storage 224 in response to a request from the user terminal 10 and transmits the screen configuration information to the user terminal 10. The screen configuration writing unit 223 writes screen configuration information transmitted from the user terminal 10 in the screen configuration storage 224.

By contrast, the user terminal 10 includes a screen configuration obtaining unit 11, a screen reproduction unit 12, a screen configuration changing unit 13, a screen configuration transmission unit 14, a screen configuration saving unit 15, and the like. Each of these units is implemented by a process that at least one program to be installed on the user terminal 10 causes the CPU 104 to perform. The user terminal 10 also uses a screen configuration storage 16. The screen configuration storage 16 can be implemented using the auxiliary memory device 102 or a storage device that can be connected to the user terminal 10 via a network.

The screen configuration obtaining unit 11 obtains screen configuration information to change or edit from any one of image forming devices 20 or the screen configuration storage 16. The screen reproduction unit 12 emulates a display process of the initial screen performed by the panel control unit 221 based on the screen configuration information. In other words, the screen reproduction unit 12 displays the initial screen in the same form as displayed in the image forming device 20 based on the screen configuration information obtained by the screen configuration obtaining unit 11. The screen configuration changing unit 13 changes the screen configuration information in response to an instruction to change the displayed initial screen. The screen configuration transmission unit 14 transmits the changed screen configuration information to a specified image forming device 20. The screen configuration saving unit 15 saves the changed screen configuration information in the screen configuration storage 16.

Figure 5:
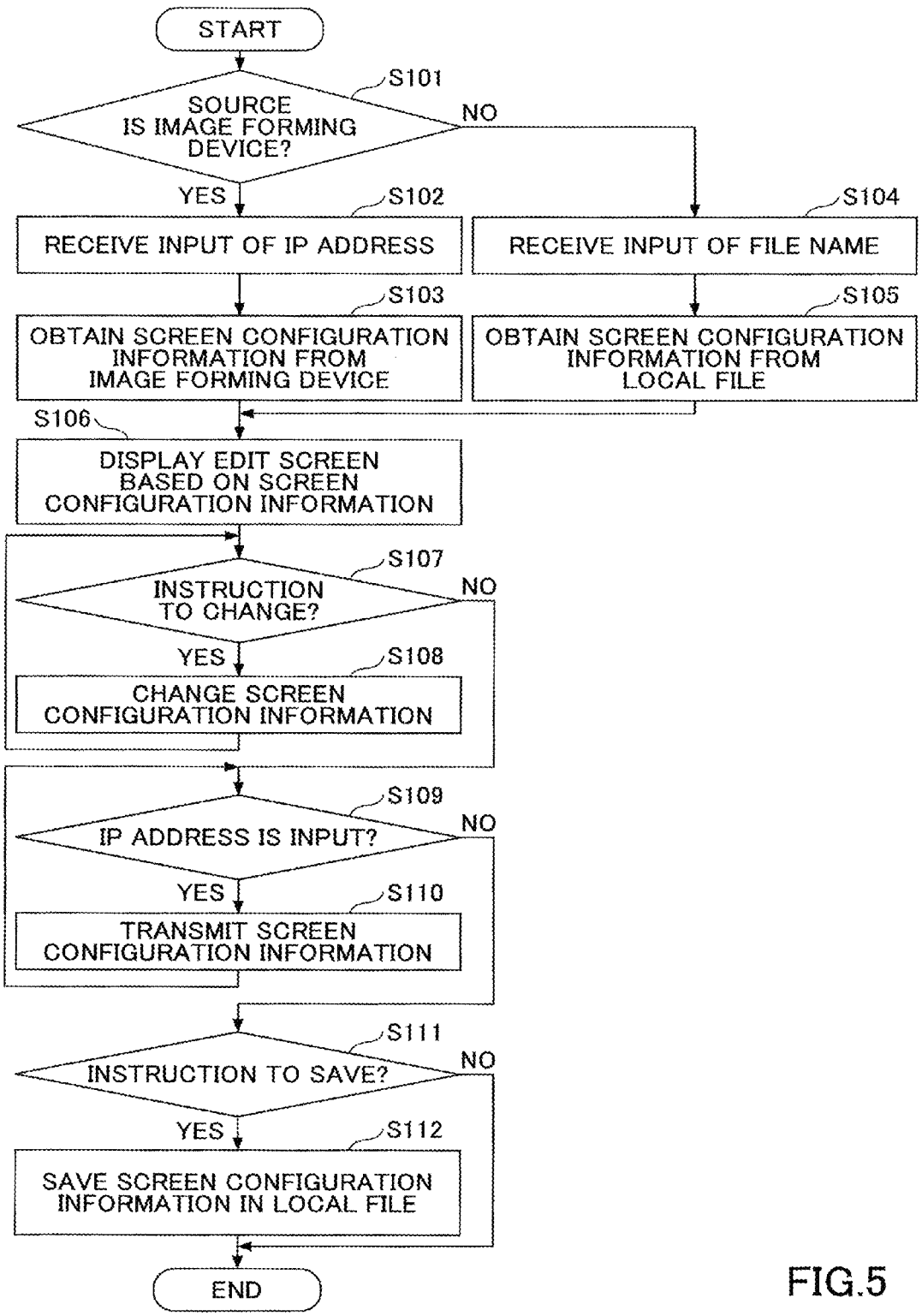
FIG. 5 is a flowchart illustrating a procedure performed by a user terminal.

In the following, a procedure performed through the user terminal 10 is described. FIG. 5 is a flowchart illustrating the procedure performed through the user terminal 10. In the description of FIG. 5, a user operates the user terminal 10.

For example, when the user inputs an instruction to obtain screen configuration information, the screen configuration obtaining unit 11 determines whether the instruction specifies screen configuration information to be obtained from the image forming device 20 or from a local file of the user terminal 10 as a source (S101). The "local file" refers to a file stored in the screen configuration storage 16, for example. However, the screen configuration information may be stored in the screen configuration storage 16 in a data form other than a file.

If the screen configuration information is to be obtained from the image forming device 20 as the source (Yes in S101), the screen configuration obtaining unit 11 receives an input of an IP address of the image forming device 20 as the source from the user (S102). For example, the screen configuration obtaining unit 11 may display a screen for an input of the IP address and the input of the IP address may be received via the screen. In addition, other than the IP address, different identification information such as a Uniform Resource Locator (URL) may be input.

Then the screen configuration obtaining unit 11 obtains screen configuration information stored in the screen configuration storage 224 of the image forming device 20 corresponding to the input IP address (S103). More specifically, the screen configuration obtaining unit 11 transmits a request to obtain the screen configuration information to the image forming device 20. The screen configuration reading unit 222 of the image forming device 20 obtains, in response to the request, the screen configuration information stored in the screen configuration storage 224 and returns the obtained screen configuration information to the screen configuration obtaining unit 11.

Figure 6:
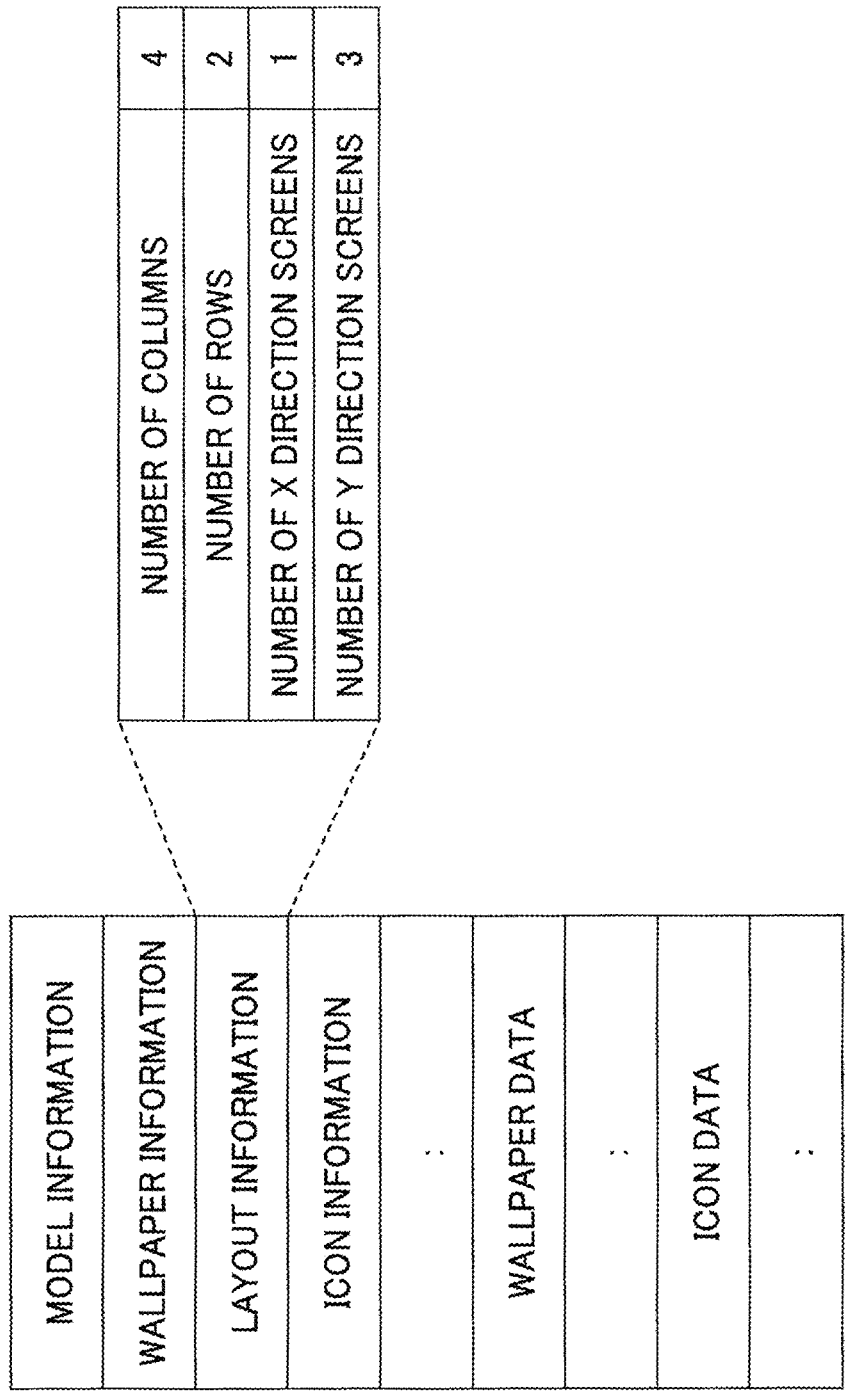
FIG. 6 is a diagram showing a configuration of screen configuration information.

FIG. 6 is a diagram showing a configuration of the screen configuration information. Although the screen configuration information is represented in table form in FIG. 6 for convenience sake, the screen configuration information may be described using eXtensible Markup Language (XML), for example.

In FIG. 6, the screen configuration information includes model information, wallpaper information, layout information, icon information, wallpaper data, icon data, and the like. However, other information may be included in the screen configuration information.

The model information is about the model (machine type) of the image forming device 20 to which the screen configuration information can be applied (the screen configuration information is valid). For example, a model name or the like is included in the model information. The wallpaper information indicates image data (hereafter "wallpaper data") used as wallpaper (background) of the initial screen. For example, identification information (hereafter "wallpaper ID") about any one of pieces of wallpaper data described below is included in the wallpaper information.

The layout information is about arrangement of display parts (hereafter "icons") in the initial screen.

For each icon arranged in the initial screen, the icon information is included in the screen configuration information. For example, each piece of icon information includes an arrangement location and the like of an icon.

The wallpaper data includes at least one piece of image data available for wallpaper of the initial screen. In the screen configuration information, each of at least one piece of wallpaper data is encoded and listed, for example. Each piece of wallpaper data is associated with a wallpaper ID.

The icon data is about image data on icons (hereafter "icon data") included by default. In the screen configuration information, icon data for each standard application program in the image forming device 20 is encoded and listed, for example. Each piece of icon data is associated with identification information (hereafter "icon ID").

In FIG. 6, the layout information includes a number of columns, a number of rows, a number of X direction screens, a number of Y direction screens, and the like. The number of columns indicates a number of icons that can be arranged horizontally on a single screen. The number of rows indicates a number of icons that can be arranged vertically on the single screen. The number of X direction screens indicates a number of screens in the horizontal direction. The number of Y direction screens indicates a number of screens in the vertical direction. The "screen" indicates a unit of a display area (display field) that can be switched by a swipe operation or a scroll operation, for example. In FIG. 6, the number of columns=4, the number of rows=2, the number of X direction screens=1, and the number of Y direction screens=3. In this case, the initial screen has the layout as shown in FIG. 7.

Figure 7:
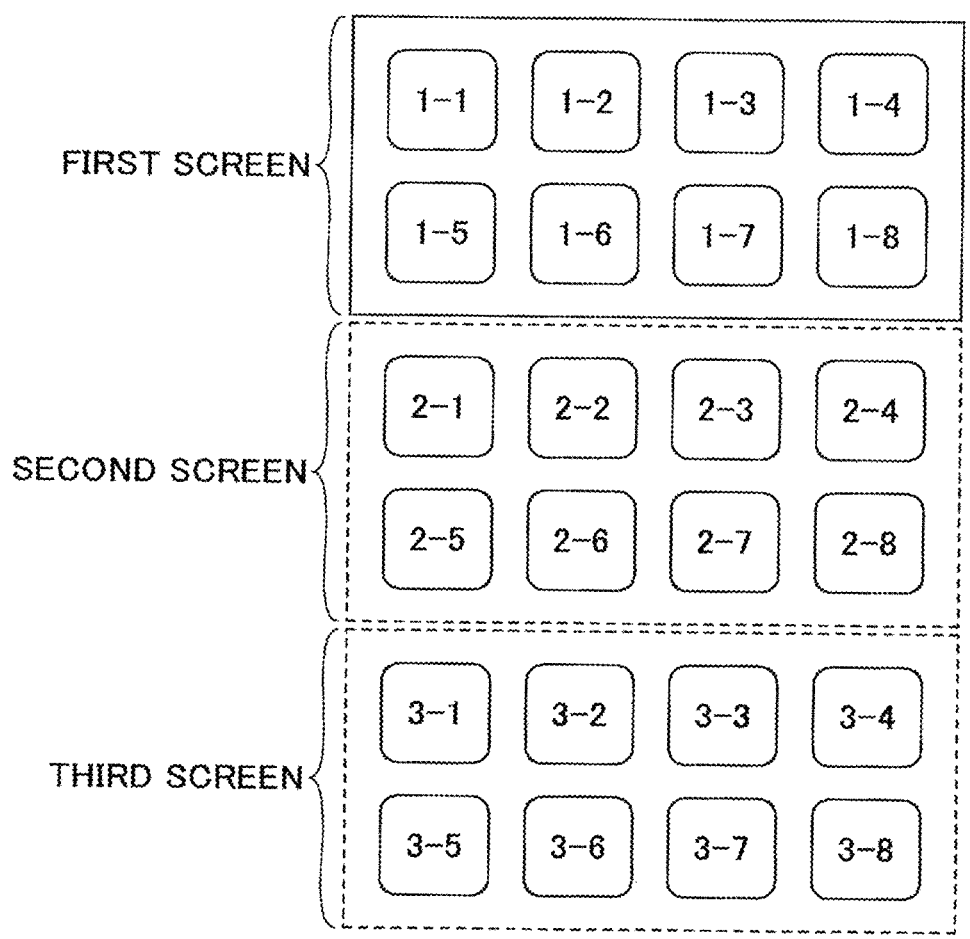
FIG. 7 is a diagram showing a layout of an initial screen.

FIG. 7 is a diagram showing the layout of the initial screen. In FIG. 7, three screens, from a first screen to a third screen, are shown in the perpendicular direction. An area that can be displayed at a time is a single screen. Each screen includes arrangement locations for (eight) icons in two rows and four columns. Each arrangement location has a coordinate value represented by a form of "<screen number>-<location number>." The screen number is an identification number of each screen. The location number is a serial number in each screen. In other words, because each screen includes eight arrangement locations in FIG. 7, the location number has values from 1 to 8.

Further, each piece of icon information, which is a part of screen configuration information, has the configuration as shown in FIGS. 8A to 8C, for example. FIGS. 8A to 8C show the configuration of a single piece of icon information. FIG. 8A is a diagram showing the configuration of icon information about an icon for an application program. FIG. 8B is a diagram showing the configuration of icon information about an icon for a widget. FIG. 8C is a diagram showing the configuration of icon information about an icon for a shortcut. In other words, the icon information may have a different configuration depending on the substance corresponding to the icon. However, in FIGS. 8A to 8C, the type and arrangement location are common items.

The type is an item that indicates the type of substance corresponding to the icon. For example, "application" indicates an application program, "widget" indicates a widget, and "url" indicates a shortcut to a Uniform Resource Locator (URL). The arrangement location is an item that indicates a location where an icon is arranged, using a coordinate value shown in FIG. 7. In FIG. 8B, the arrangement location is (1-3,1-7). This indicates that the arrangement location is between "1-3" and "1-7." Further, the arrangement location may be specified as (1-7,(+0%,+30%)), for example. This indicates that the arrangement location shifts 0% in the X direction and shifts+30% in the Y direction relative to the arrangement location of "1-7." Further, the arrangement location of an icon to be hidden is "0-0."

The icon information in FIG. 8A further includes an icon ID, an application ID, a name, or the like. The icon ID is an ID of any one of pieces of icon data included in the screen configuration information. In other words, an icon according to the icon information is displayed with icon data having the icon ID. The application ID is an ID of an application program corresponding to the icon and is used when the icon is operated in the image forming device 20. The name is a display name of the icon.

The icon information in FIG. 8B further includes an application ID and icon data. The application ID is an ID of the widget corresponding to the icon. The icon data is encoded substance of icon data for displaying the icon corresponding to the icon information, for example.

The icon information in FIG. 8C further includes a URL and icon data. The URL is a URL of a reference. The icon data is encoded substance of icon data for displaying the icon corresponding to the icon information, for example.

In step S103 of FIG. 5, screen configuration information having a configuration as described with reference to FIGS. 6 to 8C is obtained.

If the screen configuration information is to be obtained from the local file as a source (No in S101), the screen configuration obtaining unit 11 receives the input of a file name from the user (S104). Then the screen configuration obtaining unit 11 obtains the screen configuration information from a file having the input file name among files stored in the screen configuration storage 16 (S105). The screen configuration information obtained here has the configuration as described with reference to FIGS. 6 to 8C. In addition, the model name (machine type name) of the image forming device 20 may be input rather than the file name. In this case, screen configuration information about this particular model may be obtained.

In addition, before the image forming device 20 ordered by a customer is delivered, for example, steps S104 and S105 are a useful procedure if screen configuration information about the image forming device 20 needs to be customized in advance. Alternatively, steps S104 and S105 are also useful when using customized screen configuration information about a certain image forming device 20 in order to generate screen configuration information about another image forming device 20.

Following step S103 or S105, the screen reproduction unit 12 displays, based on the obtained screen configuration information, an edit screen including an initial screen in the display device 106 (S106).

Figure 9:
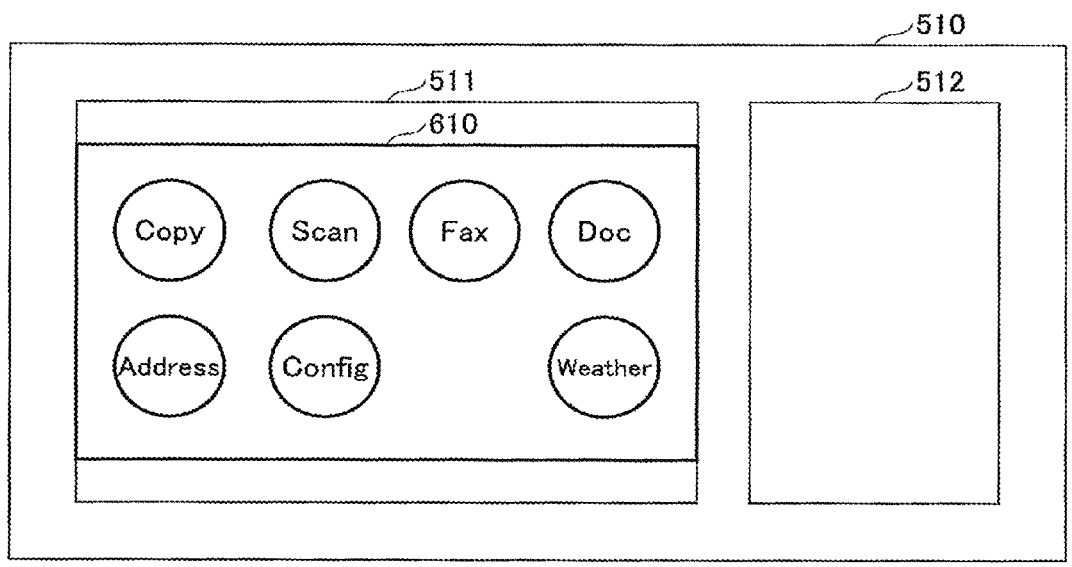
FIG. 9 is a diagram illustrating display of an edit screen.

FIG. 9 is a diagram illustrating the display of the edit screen. In FIG. 9, an edit screen 510 includes a display field 511 and a menu field 512. The display field 511 is a field where an initial screen 610 is reproduced based on screen configuration information. In other words, the initial screen 610 is displayed in the display field 511 in the same manner as displayed on the operation panel 25 of the image forming device 20. The menu field 512 is a field where various types of operations are received.

The initial screen 610 may include seven icons such as "Copy," "Scan," "Fax," "Doc," "Address," "Config," and "Weather." While the initial screen 610 is displayed in the image forming device 20, if any one of the icons is selected, a process corresponding to an application ID or a URL included in the icon information about the icon is performed.

If an instruction to change a configuration of the initial screen 610 is input by the user via the edit screen 510 (Yes in S107), the screen configuration changing unit 13 applies a change depending on the instruction to the screen configuration information (S108). For example, the user can change a location of an icon by dragging the icon on the initial screen 610 displayed in the display field 511. If the icon is dragged to another icon, arrangement locations of the dragged icon and the other icon are switched. In this case, a value of the arrangement location included in the icon information about the icon whose arrangement location is changed is changed. Further, if a Delete key is pressed while any one of the icons is selected, the screen configuration changing unit 13 changes the value of the arrangement location included in the icon information about the icon to "0-0."

Further, if any one of the icons is right-clicked, the screen configuration changing unit 13 displays a context menu including menu items such as "icon change" and "name change." In this context menu, if the "icon change" is selected, it is possible to change icon data. For example, it is possible to add icon data stored in the auxiliary memory device 102 of the user terminal 10 as icon data in the screen configuration information. And it is possible to set the added icon data as icon data for the right-clicked icon.

Further, if the "name change" is selected, it is possible to change the name included in the icon information. In addition, a menu item "restore icon setting" may be included in the context menu. If this menu item is selected, the screen configuration changing unit 13 may restore the icon data that has been changed or the name that has been changed.

Further, when the menu field 512 is operated, the screen configuration changing unit 13 displays a list of wallpaper data in the menu field 512, the wallpaper data being included in the screen configuration information. If any one of pieces of wallpaper data is selected from the list, wallpaper information in the screen configuration information is overwritten with the wallpaper ID of the selected wallpaper data. As a result, wallpaper of the initial screen 610 is changed. Further, image data stored in the auxiliary memory device 102 of the user terminal 10 may be added to the wallpaper data in the screen configuration information. In accordance with this, it is possible to use the image data stored in the auxiliary memory device 102 as wallpaper data for the initial screen 610.

Figure 10:
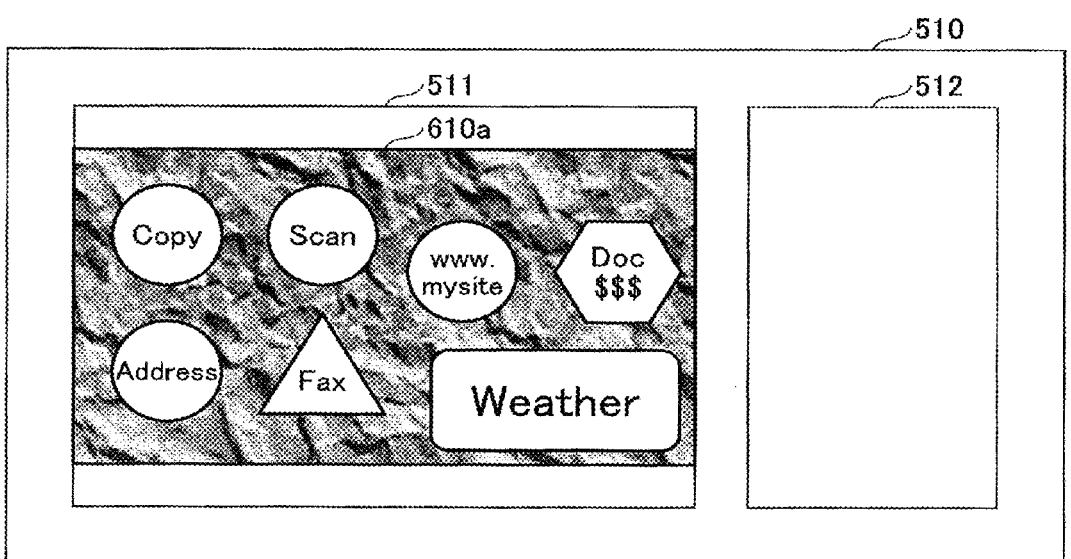
FIG. 10 is a diagram illustrating display of an edit screen including a changed initial screen.

When the above-mentioned change (edit) is performed, the initial screen 610 is changed as shown in FIG. 10, for example. FIG. 10 is a diagram illustrating display of the edit screen including the changed initial screen.

In the display field 511 of the edit screen 510 in FIG. 10, an initial screen 610*a* that has been changed is displayed. In the initial screen 610*a*, arrangement locations of icons are changed, icon data is changed, and wallpaper is changed, for example. Specifically, icon data on the "Fax" and "Doc" icons is changed and the "Config" icon is deleted. The name of the "Doc" icon is also changed. Further, a size of the "Weather" icon is also changed.

Subsequently, if an end of the change is directed (No in S107) and an IP address of a destination to which the changed screen configuration information is transmitted is input (Yes in S109), the screen configuration transmission unit 14 transmits the changed screen configuration information to an image forming device 20 having the input IP address (S110). When the screen configuration writing unit 223 of the image forming device 20 receives the screen configuration information, the screen configuration writing unit 223 saves the screen configuration information in the screen configuration storage 224. In this case, original screen configuration information may be overwritten with the received screen configuration information.

In addition, step S110 may be repeated numerous times. In other words, the same screen configuration information may be applied to a plurality of image forming devices 20.

When the input of the IP address ends (NO in S109) and an instruction to save the screen configuration information is input (Yes in S111), the screen configuration saving unit 15 saves the changed screen configuration information in the screen configuration storage 16 (S112). For example, if steps S104 and S105 are performed and screen configuration information to be changed is obtained from the screen configuration storage 16, overwrite saving may be ordered. In this case, the screen configuration saving unit 15 overwrites the original screen configuration information with the changed screen configuration information. Further, if a name is given upon saving, the screen configuration saving unit 15 saves the changed screen configuration information in the screen configuration storage 16 in association with the name input by the user. The screen configuration information stored in the screen configuration storage 16 will be a selection candidate in steps S104 and S105 of a next procedure. Further, screen configuration information for another image forming device 20 may be generated based on the screen configuration information stored in the screen configuration storage 16.

In addition, if the configuration of the initial screen will differ between users, the screen configuration information may be stored in the screen configuration storage 224 or the screen configuration storage 16 in association with identification information (such as a user ID) about each user. For example, the user ID may be included in the screen configuration information. In this case, when the process in FIG. 5 starts, the user ID may be specified together with a source of the screen configuration information. The screen configuration obtaining unit 11 may obtain the screen configuration information corresponding to the specified user ID.

In related art, it is necessary to perform an operation to change a configuration of a screen for each device. Accordingly, if the same change is to be applied to a plurality of devices, the same operation must be repeated.

According to the present embodiment of the present invention, it is possible to reduce the burden required for changing the configuration of a screen displayed in a device.

As mentioned above, according to the present embodiment, the user can use the user terminal 10 to change screen configuration information about the initial screen. It is possible to transmit and apply the changed screen configuration information not only to the image forming device 20 that is the source of the original screen configuration information, but also to another image forming device 20. In other words, by changing a single piece of screen configuration information, it is possible to change the configuration of the initial screen of a plurality of image forming devices 20. Accordingly, it is possible to reduce the burden required for changing the configuration of a screen displayed in the image forming device 20.

In addition, the present embodiment may be applied to a screen displayed in a device other than the image forming device 20. For example, the present embodiment may be applied to projectors, video conference systems, digital cameras, and the like.

In the present embodiment, the user terminal 10 is an example of an information processing apparatus. The screen configuration obtaining unit 11 is an example of an obtaining unit. The screen reproduction unit 12 is an example of a display control unit. The screen configuration changing unit 13 is an example of a changing unit. The screen configuration transmission unit 14 is an example of a transmission unit.

According to the embodiment of the present invention, it is possible to reduce a burden required for changing the configuration of a screen displayed in a device.

While the embodiment of the present invention is described in detail, the present invention is not restricted to the particulars of the specific embodiment described, and various variations and modifications may be made without departing from the scope of the present invention as described in the claims.

The present application is based on and claims the benefit of priority of Japanese Priority Application No. 2015-032518 filed on Feb. 23, 2015, the entire contents of which are hereby incorporated by reference.

What is claimed is:

1. An information processing apparatus, comprising:
a network interface configured to connect through a network to a plurality of devices each including a screen and configuration data relating to the screen thereof;
a user interface including a display device; and
circuitry configured to perform:
 obtaining over a network, from one of the plurality of devices the configuration data relating to the screen of said one device;
 displaying information on the display device based on the configuration data relating to the screen of said one device which has been obtained;
 editing the configuration data based on a change request received via the user interface; and
 transmitting the configuration data which has been edited to the plurality of devices so as to cause the at least one other of the plurality of devices to update the configuration data thereof to the configuration data which has been edited.

2. The information processing apparatus as claimed in claim 1, wherein:
said plurality of devices includes a plurality of image forming devices including an image forming unit and an operation panel that displays a screen including a home screen, and receives an input from the user that controls the image forming unit,
the obtaining obtains the configuration data which is configuration data from the operation panel of one of the plurality of image forming devices, and
the transmitting transmits the configuration data which has been edited to the plurality of image forming devices.

3. The information processing apparatus as claimed in claim 2, wherein:
the operation panel includes an operating system that is independent of a main body that includes the image forming unit.

4. The information processing apparatus as claimed in claim 2, further comprising:
an emulator which displays a same screen as a screen which is to be displayed on the operation panel of one of the plurality of image forming devices.

5. The information processing apparatus as claimed in claim 2, wherein the transmitting of the configuration data, the configuration data relating to the screen which has been edited, includes:
transmitting the configuration data to only one of the plurality of image forming devices, when a single IP address is designated, and
transmitting the configuration data to said the plurality of image forming devices, when plural IP addresses are designated.

6. The information processing apparatus as claimed in claim 2, wherein:
the screen configuration includes wallpaper information, and
the configuration data which is transmitted includes image data corresponding to the wallpaper information.

7. The information processing apparatus as claimed in claim 2, wherein:
the screen configuration includes layout information of icons, and
the configuration data which is transmitted includes data corresponding to the layout of the icons.

8. A method, comprising:
obtaining over a network, from one of a plurality of devices each including a screen, configuration data relating to the screen of said one device
displaying information on a display device of a user interface based on the configuration data relating to the screen of said one device which has been obtained;
editing the configuration data based on a change request received via the user interface; and
transmitting the configuration data which has been edited to the plurality of devices so as to cause the at least one other of the plurality of devices to update the configuration data thereof to the configuration data which has been edited.

9. The method as claimed in claim 8, wherein:
said plurality of devices includes a plurality of image forming devices including an image forming unit and an operation panel that displays a screen including a home screen, and receives an input from the user that controls the image forming unit, the obtaining obtains the configuration data which is configuration data from the operation panel of one of the plurality of image forming devices, and the transmitting transmits the configuration data which has been edited to the plurality of image forming devices.

10. The method as claimed in claim 9, wherein:

the operation panel includes an operating system that is independent of a main body that includes the image forming unit.

11. The method as claimed in claim 9, further comprising:

displaying, on an emulator, a same screen as a screen which is to be displayed on the operation panel of one of the plurality of image forming devices.

12. The method as claimed in claim 9, wherein the transmitting of the configuration data, the configuration data relating to the screen which has been edited, includes:

transmitting the configuration data to only one of the plurality of image forming devices, when a single IP address is designated, and transmitting the configuration data to the plurality of image forming devices, when plural IP addresses are designated.

13. The method as claimed in claim 9, wherein:

the screen configuration includes wallpaper information, and the configuration data which is transmitted includes image data corresponding to the wallpaper information.

14. The method as claimed in claim 9, wherein:

the screen configuration includes layout information of icons, and the configuration data which is transmitted includes data corresponding to the layout of the icons.

15. A non-transitory computer program product that is executed on a computer to cause the computer to perform a process, the process comprising:

obtaining over a network, from one of a plurality of devices each including a screen, configuration data relating to the screen of said one device displaying information on a display device of a user interface based on the configuration data relating to the screen of said one device which has been obtained;

editing the configuration data based on a change request received via the user interface; and transmitting the configuration data which has been edited to the plurality of devices so as to cause the at least one other of the plurality of devices to update the configuration data thereof to the configuration data which has been edited.

16. The non-transitory computer program product as claimed in claim 15, wherein:

said plurality of devices includes a plurality of image forming devices including an image forming unit and an operation panel that displays a screen including a home screen, and receives an input from the user that controls the image forming unit, the obtaining obtains the configuration data which is configuration data from the operation panel of one of the plurality of image forming devices, and the transmitting transmits the configuration data which has been edited to the plurality of image forming devices.

17. The non-transitory computer program product as claimed in claim 16, wherein:

the operation panel includes an operating system that is independent of a main body that includes the image forming unit.

18. The non-transitory computer program product as claimed in claim 16, further comprising:

displaying, on an emulator, a same screen as a screen which is to be displayed on the operation panel of one of the plurality of image forming devices.

19. The non-transitory computer program product as claimed in claim 16, wherein the transmitting of the configuration data, the configuration data relating to the screen which has been edited, includes:

transmitting the configuration data to only one of the plurality of image forming devices, when a single IP address is designated, and transmitting the configuration data to the plurality of image forming devices, when plural IP addresses are designated.

20. The non-transitory computer program product as claimed in claim 16, wherein:

the screen configuration includes wallpaper information, and the configuration data which is transmitted includes image data corresponding to the wallpaper information.

21. The non-transitory computer program product as claimed in claim 16, wherein:

the screen configuration includes layout information of icons, and the configuration data which is transmitted includes data corresponding to the layout of the icons.

* * * * *